United States Patent

Voelker et al.

[11] Patent Number: 6,014,513
[45] Date of Patent: Jan. 11, 2000

[54] DISCOVERING CODE AND DATA IN A BINARY EXECUTABLE PROGRAM

[75] Inventors: Geoffrey Michael Voelker; Theodore H. Romer; Alastair Wolman; Dennis Chua Lee; Brian N. Bershad, all of Seattle, Wash.; John Bradley Chen, Winchester, Mass.; Henry M. Levy, Seattle, Wash.; Wayne Anthony Wong, Hillsboro, Oreg.

[73] Assignee: University of Washington, Seattle, Wash.

[21] Appl. No.: 08/996,839

[22] Filed: Dec. 23, 1997

[51] Int. Cl.⁷ ..................................................... G06F 9/445
[52] U.S. Cl. ........................ 395/703; 395/701; 395/702; 395/704; 395/705; 395/706; 395/707
[58] Field of Search ................................... 395/703, 704, 395/705, 709

[56] References Cited

U.S. PATENT DOCUMENTS

| | | | |
|---|---|---|---|
| 4,937,777 | 6/1990 | Flood et al. | 710/107 |
| 5,115,500 | 5/1992 | Larsen | 712/209 |
| 5,151,981 | 9/1992 | Westcott et al. | 714/50 |
| 5,214,763 | 5/1993 | Blaner et al. | 712/213 |
| 5,216,613 | 6/1993 | Head, III | 364/468.08 |
| 5,295,249 | 3/1994 | Blaner et al. | 712/213 |
| 5,603,043 | 2/1997 | Taylor et al. | 712/1 |
| 5,790,856 | 8/1998 | Lillich | 395/703 |
| 5,930,509 | 7/1999 | Yates et al. | 395/707 |

OTHER PUBLICATIONS

Ramsey et al., "Specifying Representations of Machine Instructions", ACM, pp. 492–524, May 1997.
Ramsey, "Relocating Machine Instruction by Currying", ACM, pp. 226–236, May 1996.
Hannan, "Operational Semantics–directed Compliers and Machine Architectures", ACM, pp. 1215–1247, Jul. 1994.
Cifuentes et al., "Intraprocedural Static Slicing of Binary Executables", IEEE, pp. 188–195, Oct. 1997.
Nichols et al., Data Management and Control–flow Aspects of an SIMD/SPMD parallel Language/Complier, IEEE, pp. 222–234, Feb. 1993.
Aho et al., "Compilers Principles, Techniques, and Tools", Addison–Wesley Publishing, pp. 10–15, 513–518, 522–538, 1988.

*Primary Examiner*—Tanq R. Hafiz
*Assistant Examiner*—Ted T. Vo
*Attorney, Agent, or Firm*—Ronald M. Anderson

[57] ABSTRACT

A computer software tool used for automatically identifying code portions and data portions of a binary executable software program in which the code portions include machine instructions that are of arbitrary length. Software products are typically distributed as binary, executable files, which comprise a string of binary values. In general, an executable file has no structure or meaning, except as determined by its behavior when dynamically executed, one instruction at a time, by a digital computer. The software tool determines a set of addresses for any known code and data portions. The tool is then used to disassemble machine instructions, beginning at a starting address for each known code portion, to identify the target addresses of other code portions and other data portions. Other sections of the binary executable software program that could be either code or data are then analyzed to identify additionAL code and data portions. As new portions are identified, the steps are repeated, until no further code or data portions are identifiable. The binary executable software program may include a plurality of executable modules. The entry addresses for each executable module and any addresses for code portions and data portions referenced and identified by any debug address, any export address, and any relocation address is added to the set of addresses. The binary executable software program is then executed to dynamically identify other executable modules so that the set of addresses can be further extended.

39 Claims, 5 Drawing Sheets

DISCOVERING CODE AND DATA IN A BINARY EXECUTABLE PROGRAM

FIELD OF THE INVENTION

The present invention generally relates to a method and system for identifying code and data portions of a binary executable program, and more specifically, to identifying the code and data in a binary executable program in which the code comprises arbitrary (i.e., variable or fixed) length machine instructions.

BACKGROUND OF THE INVENTION

Computer programs are typically written in a high level language or assembly language. The high level language listing of a computer program provides complete information about the program and its algorithms, and is easily read and understood by other programmers. In the process of producing an executable computer program in a high level language that is not interpreted, the high level language program instructions are first compiled into a relocatable object file, which is a binary version of the program. While an object file is not readable in the same sense as the high level language program, object files contain significant information that allows them to be understood and processed by other programs. For example, object files typically contain symbol definitions, types, and names for every function or global variable used in the program; these definitions, types, and names indicate whether the referent of the symbol is code or data. An object file may also contain debugging information relating the instructions and data in that file to source language constructs. It is thus relatively straightforward to process an object file to determine its components, based on the defining information provided in the object file.

In the final step to produce a distributable software program, the compiled object files of the program are linked into a binary executable program. In contrast to object files, a binary executable software program contains only a very small subset of the defining information contained in the corresponding object file(s). For example, a binary executable software program will have definitions only for functions and global variables explicitly exported by that program. The defining information in a binary executable software program does not include internal branch targets, includes only a subset of the functions and global variables, and does not provide any type information. In particular, a binary executable software program does not include any mechanism that distinguishes between code and data components.

Software programs are distributed in the form of binary executables because this is the format in which the program will be loaded and executed on a computer (to implement the functions defined by the program), and in part, in order to obscure many of the details of the program. Some binary executables are more difficult than others to understand, such as those targeted for the Intel Corporation's "x86" architecture, i.e., programs written to employ machine instructions that execute on the family of processors identified by the x86 suffix, such as the 80386, 80486, 80586 (or PENTIUM), etc. Because x86 machine instructions are not of a fixed length, an instruction for this family of processors can potentially start on any arbitrary byte boundary, making it extremely difficult to differentiate code portions from data portions, in contrast to reduced instruction set computer (RISC) processors, such as the Digital Equipment Corporation's ALPHA processors, for which the differentiation between code and data in an executable file is more straightforward. However, the need frequently arises, for reasons of analysis, performance evaluation, security, or error checking, to examine a binary executable software program (through software means), to understand its structure, and possibly to introduce changes, producing a modified binary executable software program that is related to the original program, because it provides the same functions, but is also able to provide additional functionality or operate more efficiently. Accordingly, it will be apparent that a method for determining the structure of arbitrary instruction length (e.g., based on x86 architecture) binary executable software programs is required in order to satisfy such needs. Currently, a solution to this problem does not appear to exist in the prior art.

SUMMARY OF THE INVENTION

In accord with the present invention, a method is defined for automatically identifying code portions and data portions of a binary executable software program, in which the code portions comprise machine instructions that are of arbitrary length. The method includes the step of determining a set of addresses in the binary executable software program that are for any known code portions and for any known data portions. Machine instructions at a starting address for each known code portion are disassembled, to identify a set of all possible control flow paths reachable from the starting address. From the control flow paths that are thus identified, a set of target addresses is determined so as to identify other code portions and other data portions. Beginning with bytes of the binary executable software program that are located at any address that could be a starting point for either a code portion or a data portion, the bytes from that point are analyzed to determine if they comprise a code portion. Addresses in the binary executable software program that have not yet been identified as being for code portions and for data portions are then reiteratively processed by repeating the previous steps to identify other code portions and data portions in the binary executable software program. This repetitive process continues until no further code portions and data portions are identifiable.

The binary executable software program may comprise a plurality of executable modules. If so, the step of determining the set of addresses in the binary executable software program that are for any known code portions and for any known data portions includes the step of identifying the plurality of executable modules. An executable module from the plurality of executable modules may include both code and data portions. The method then further includes the step of statically determining and adding an entry address for each of the plurality of executable modules to the set of addresses. Also, any addresses for code portions and data portions that are referenced and identified by any debug address, any export address, and any relocation address within the binary executable software program are added to the set of addresses. The method also includes the step of executing the binary executable software program to dynamically identify other executable modules of the plurality of executable modules while the binary executable software program is running. In this case, the method provides for determining and adding an entry address for each of the other executable modules. Similarly, any addresses for code portions and data portions, which are referenced and identified by any debug address, any export address, and any relocation address within the binary executable software program, are also added to the set of addresses.

The method preferably further comprises the step of removing any addresses for data portions that have been determined or identified from any unexamined address ranges for code portions that have been determined or identified.

The step of disassembling machine instructions preferably comprises the step of determining for each control flow path, whether a control flow instruction in the control flow path is direct or indirect. If the instruction is direct, the control flow path is followed to a target address. If the instruction is indirect, the target address is determined from a memory location or register referenced by the instruction.

In addition, the step of disassembling machine instructions preferably comprises the step of determining for each control flow path, whether each control flow instruction in the control flow path is conditional or unconditional. For each control flow instruction in the control flow path, if the control flow instruction is conditional, a following instruction is identified as an implicit target address, and a target address referenced in a branch by the control flow instruction is also identified. Conversely, if the control flow instruction is unconditional, a target address is identified based only on the control flow instruction.

The step of analyzing the bytes comprises the step of determining if the bytes comprise a set of instruction sequences for a procedure prolog, and if so, identifying the bytes as a code portion. If the bytes include a sequence of printable characters of at least a predefined length, the bytes are identified as a data portion. In addition, the method preferably provides for attempting to speculatively disassemble the bytes, based on a presumption that the bytes comprise a code portion. The bytes are classified as an unknown portion of the binary executable software program if the attempt to speculatively disassemble the bytes results in at least one of the following: (a) an internal logical inconsistency; (b) an undefined machine instruction; (c) a transfer into a known data portion; (d) a plurality of machine instructions that meets one of a plurality of predefined criteria indicating that the plurality of machine instructions are abnormal; (e) a plurality of filler bytes; (f) a sequence of no operation instructions; and (g) more than a predefined minimum of machine instructions having a length greater than a predefined threshold.

The step of reiteratively processing addresses in the binary executable software program that have not yet been identified as being for code portions and for data portions comprises the step of treating a starting address for each range of addresses not yet identified as a presumed new root address of either a code section or a data section before either disassembling the machine instructions or analyzing the bytes.

If the binary executable software program includes sections that are not identifiable as either a code portion or a data portion, these sections are left undisturbed and treated as unidentified portions of the binary executable software program. Leaving unidentifiable sections undisturbed enables the method to be safe, i.e., the original functionality of the program is still preserved.

The method also includes the step of determining a compiler that was used to compile the binary executable software program. Code portions and data portions of the binary executable software program are then identified as a function of compiler specific parameters based upon the compiler that was used to produce the binary executable software program.

Another aspect of the present invention is directed to a system for implementing functions generally consistent with the steps of the method discussed above. The system includes a memory in which are provided machine instructions that define a software tool to carry out these functions when executed on a processor.

Yet another aspect of the invention is directed to a computer readable medium having computer-executable instructions, which when executed on a computer, cause the computer to automatically identify code portions and data portions in a binary executable software program by applying steps generally consistent with those of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The invention described here is a method or process for examining a binary executable file comprising instructions that are of an arbitrary (i.e., either variable or fixed) length and determining in a safe way the structure of its code and data components. Binary executable software programs written to execute on the Intel Company family of x86 processors include instructions of variable length, and it is particularly problematic to identify the structure of the code and data components in a binary executable program for such processors. In regard to this description and the claims that follow, it will be apparent that term "binary executable program" may consist of only a single executable file, or may comprise one or more modules and/or one or more other files that are required to implement the functionality of the program. Since programs, modules, and files are processed in accord with the present invention, these terms are sometime used interchangeably in the following description. Also, it should be noted that the term "safe" as used in the first sentence of this paragraph means that the method is conservative, and will not misidentify components in such a way that use of identified components will change the intended behavior (functionality) of the program. The method is described as a series of steps as described below, and generally shown in FIGS. 1–4.

Figure 1:
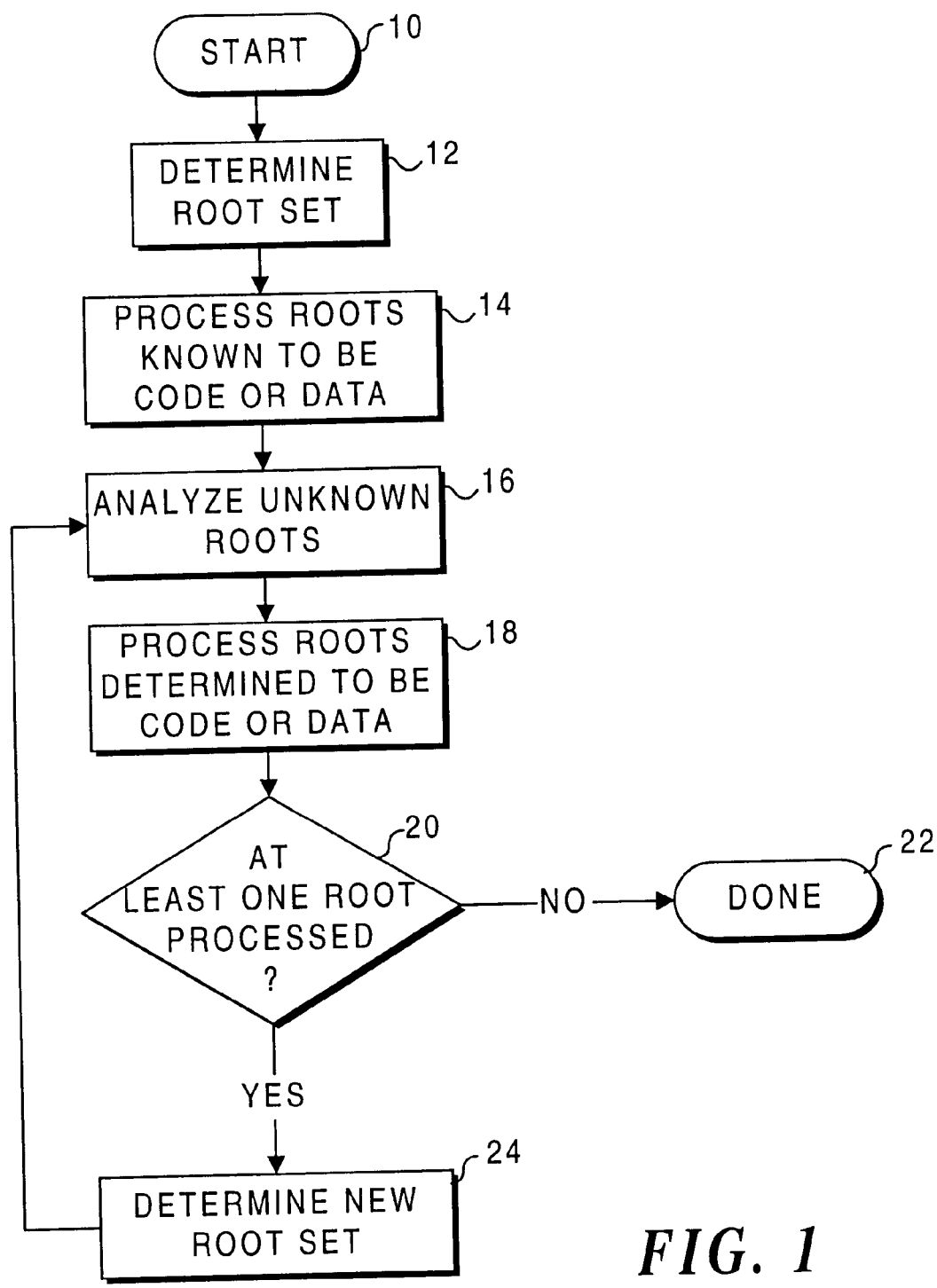
FIG. 1 is a flow chart illustrating the overall logic applied in determining the code and data portions of an executable binary software program in accord with the present invention.
Figure 2:
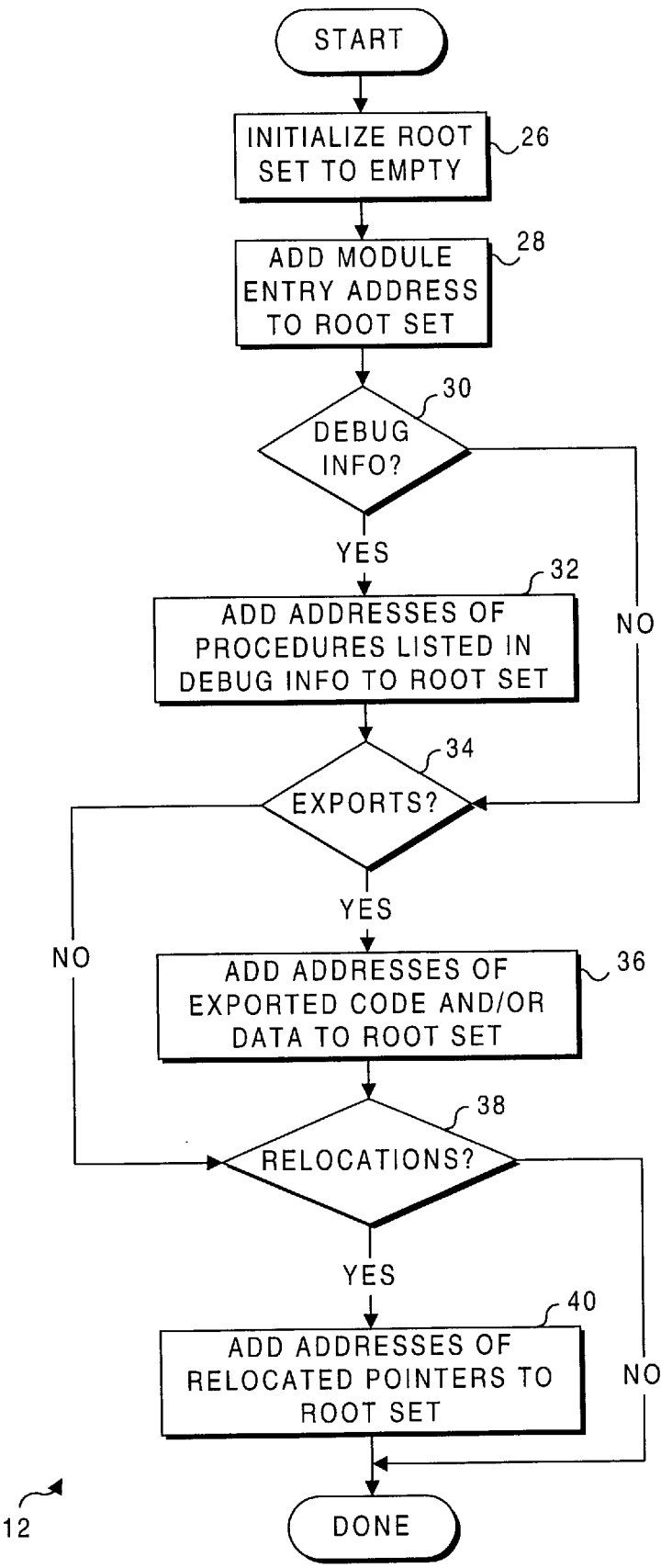
FIG. 2 is a flow chart showing details for the logic implemented in determining a root sequence of the executable binary software program.

As shown in FIG. 1, following a start block 10, a "root set" is initially determined in a block 12. For purposes of this disclosure and the claims that follow, a "root" is an address that is known to start either code or data, but whether the root is the start of code or of data has yet to be determined. A "root set" is the set of all addresses in an executable file that are guaranteed to be code or data. Since the x86 family of Intel processors has a variable length instruction set, a code discovery procedure cannot analyze a module comprising a binary executable software program at arbitrary addresses, because an arbitrarily chosen address may reference a byte in the middle of an instruction or data element. In contrast, modules comprising binary executable software programs compiled for RISC instruction set computers have fixed length instructions, so a code discovery procedure can assume that the instructions and data elements (if any) start on predefined address alignments within an executable program or module. While the present invention is certainly applicable to software programs based on fixed length instructions, it is particularly useful for processing software programs based on Details of the steps employed to determine the root set are shown in FIG. 2. In a block 26, the root set is initialized as an empty set. The root set is created from the entry address, debug addresses, export addresses, and relocation addresses of an executable module comprising a binary executable software program as defined in the following discussion. For the executable module itself, the entry is the address at which execution begins. In a block 28, the module entry address is added to the root set. For a shared library executable module, such as a dynamically-loaded library (DLL) module, the entry is the address of the library initialization routine. The entry address is typically found in the header of the module file. Note that this entry address is always known to be for a code component—not data.

A decision block 30 determines if the executable module includes debug information. If an executable module has debugging information associated with it, then the code discovery procedure used in a preferred embodiment of the present invention examines the debugging information to determine the addresses and lengths of procedures and data elements embedded in the code sections of the module, as indicated in a block 32. The debugging information can either be embedded in an executable module or in a separate file. It should be noted that debug addresses make the code discovery process easier, but are not necessary for the method to run successfully. Also, debug addresses are typically not "complete." The debug addresses and lengths do not cover the entire address ranges of the code sections in an executable module. A negative response to decision block 30 causes the logic to loop around block 32 to a decision block 34.

A module may export code or data to export addresses for use by other modules. Decision block 34 determines if the executable module exports code or data, and if so, the addresses of exported code and/or data are added to the root set, as noted in a block 36. The addresses referenced by these export operations are typically found in an executable module section. If the response in decision block 34 is negative, the procedure loops around block 36 to a decision block 38.

To enable an executable module to be mapped into an arbitrary location in a program's address space, the executable module maintains a data structure that lists the location of all pointers in the module that would need to be updated if the module were moved from its default location. Decision block 38 determines if the executable module provides for relocations. The targets of these pointers can be pointers to data (e.g., in linked data structures), or pointers to code (e.g., to function tables that are often used in object oriented programming languages). It is these relocation targets that form the relocation addresses used in the root set, as indicated in a block 40. Again, if relocations are not provided by the executable module, the logic loops around block 40. For each executable module in the binary executable software program, the procedure shown in FIG. 2 repeats, starting at block 28, until all executable modules have been processed.

Figure 3:
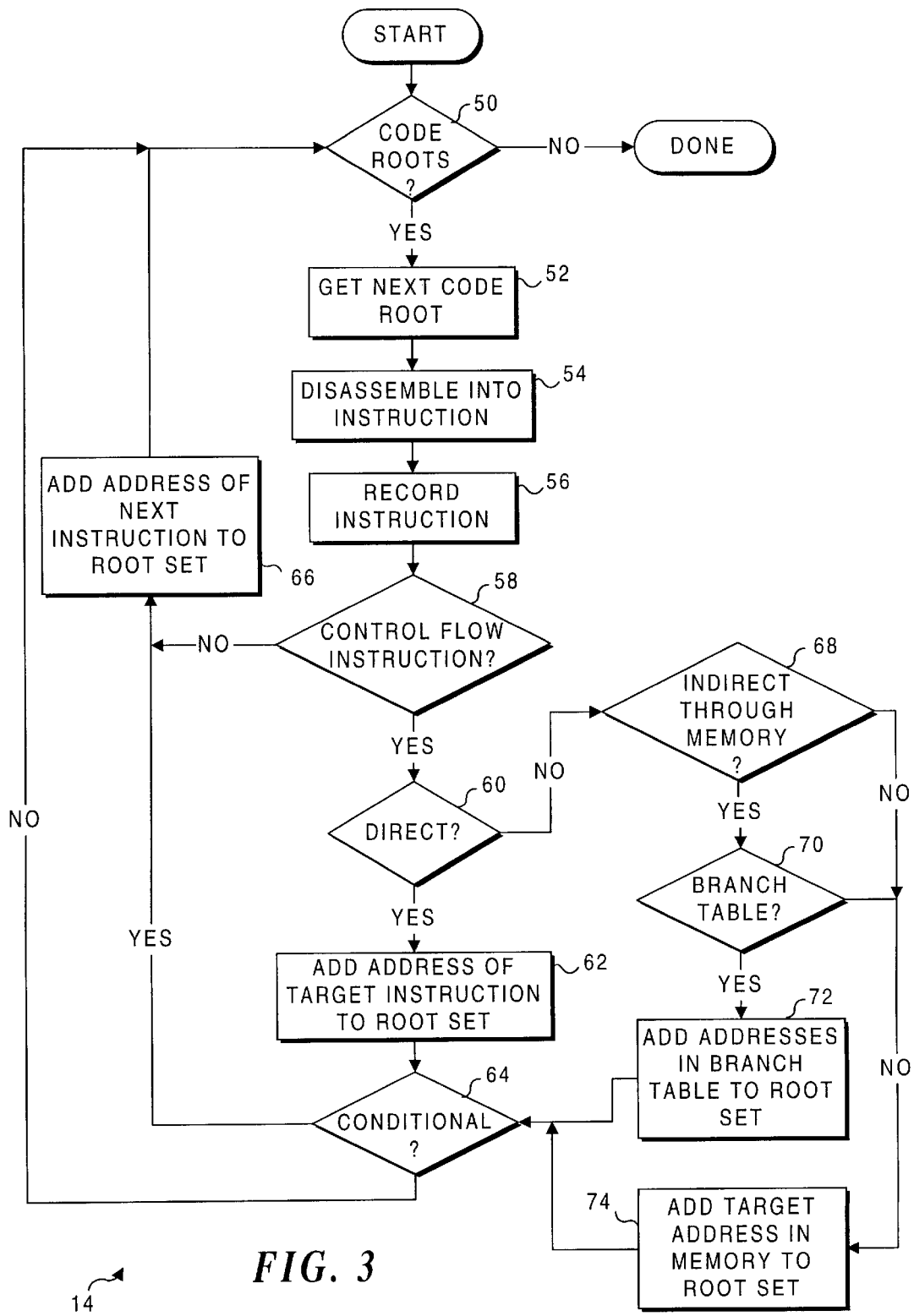
FIG. 3 is flow chart of the steps employed for processing root portions of the binary executable software program that are known to be code or data.

Referring back to FIG. 1, following the determination of the root set, a block 14 provides for processing the roots known to be code or data. Details of this step are illustrated in FIG. 3; the steps shown in this Figure are repeated for each root previously identified. Several preliminary steps not illustrated in the flow chart are carried out initially. For each root known to be data, the address range of the data is removed from the unexamined set of code segment address ranges. If the extent of the data in a portion of the binary executable software program is also known (e.g., from debugging information), then the address range corresponding to the entire set of data is recorded as being data. If the extent is not known, then the next root in the address space is examined. If the next root is also data and is within a specified distance from this root that was just examined before the next root, then all of the bytes between this root and the next are treated as data. Otherwise, the data are assumed to be the size of the smallest data unit the processor is designed to manipulate.

In FIG. 3, a decision block 50 determines if the current root being processed is a code root. For each root known to be code, the code is disassembled at that root. A block 52 provides for getting the next code root. Since the root is known to be a code root and thus known to start a valid instruction, it is appropriate to disassemble the instruction, as indicated in a block 54. The instruction is recorded in a block 56. Furthermore, since instructions immediately follow each other in the executable module, the code discovery procedure can continue disassembling instructions after the root, mimicking the dynamic execution of the processor. In effect, the code discovery procedure statically determines the set of reachable instructions from each root by reconstructing the set of all possible control flow paths reachable from that root. A decision block 58 determines if the current instruction being evaluated is a control flow instruction. If not, the logic branches to a block 66. However, if the current instruction is a control flow instruction, the procedure advances to a decision block 60.

At each control flow point, the technique employed in this embodiment examines the control flow instruction to determine the possible targets of the instruction. The set of possible targets depends upon whether the control flow instruction is direct or indirect, and whether it is conditional or unconditional.

A control flow instruction can be direct or indirect. Decision block 60 determines if the control flow instruction is direct. If it is direct, i.e., if the target address is explicitly listed in the instruction, then this target is used to continue following the control flow path, and the address of the target instruction is added to the root set, as noted in a block 62. Conversely, if the instruction uses a memory location or register to determine the target, then the procedure attempts to reconstruct the target address to find the target. A decision block 68 determines if the instruction is indirect through a memory location, and if so, a decision block 70 determines if the memory location references a branch table. A branch table is a linear array of control flow target addresses commonly used to support language constructs such as the C programming language "switch" statement. If the procedure detects such a sequence, then it is also able to find the branch table. In general, determining a register value is impossible using static techniques. However, the code discovery procedure looks for well defined instruction sequences that indicate the control flow instruction is indexing through a branch table. If so, then the linear array of addresses in the branch table is added to the root set. A negative response to either decision block 68 or decision block 70 leads to a block 74, in which the target address in memory is added to the root set. If the instruction references memory in a known data section, then the procedure uses the value of the address in this reference as the target. If the instruction uses a register, then the procedure attempts to determine the contents of the register at the time the instruction dynamically executes.

A control flow instruction can be conditional or unconditional. Following either blocks 62, 72, or 74, a decision block 64 determines if the control flow instruction is conditional. If so, then the following (i.e., next) instruction in the file is an implicit target and its address is added to the root set, as noted in block 66. If it is unconditional, then the code discovery procedure does not look beyond the control flow instruction in the linear instruction sequence (i.e., it follows the target). It is also possible that a control flow instruction has no targets. A return instruction, for example, has an implicit target that depends upon the dynamic value of the runtime stack, a target that cannot be determined statically.

Turning back to FIG. 1, a block 16 is the next step implemented. In this step, for those roots that could be code or data, the procedure analyzes the bytes that follow the root. If the analyzed bytes appear to be data, the bytes are processed as noted above for known data elements. If the analyzed bytes appear to be code, they are processed by disassembling the code at each root, also as discussed above. This step is indicated in a block 18.

Figure 4:
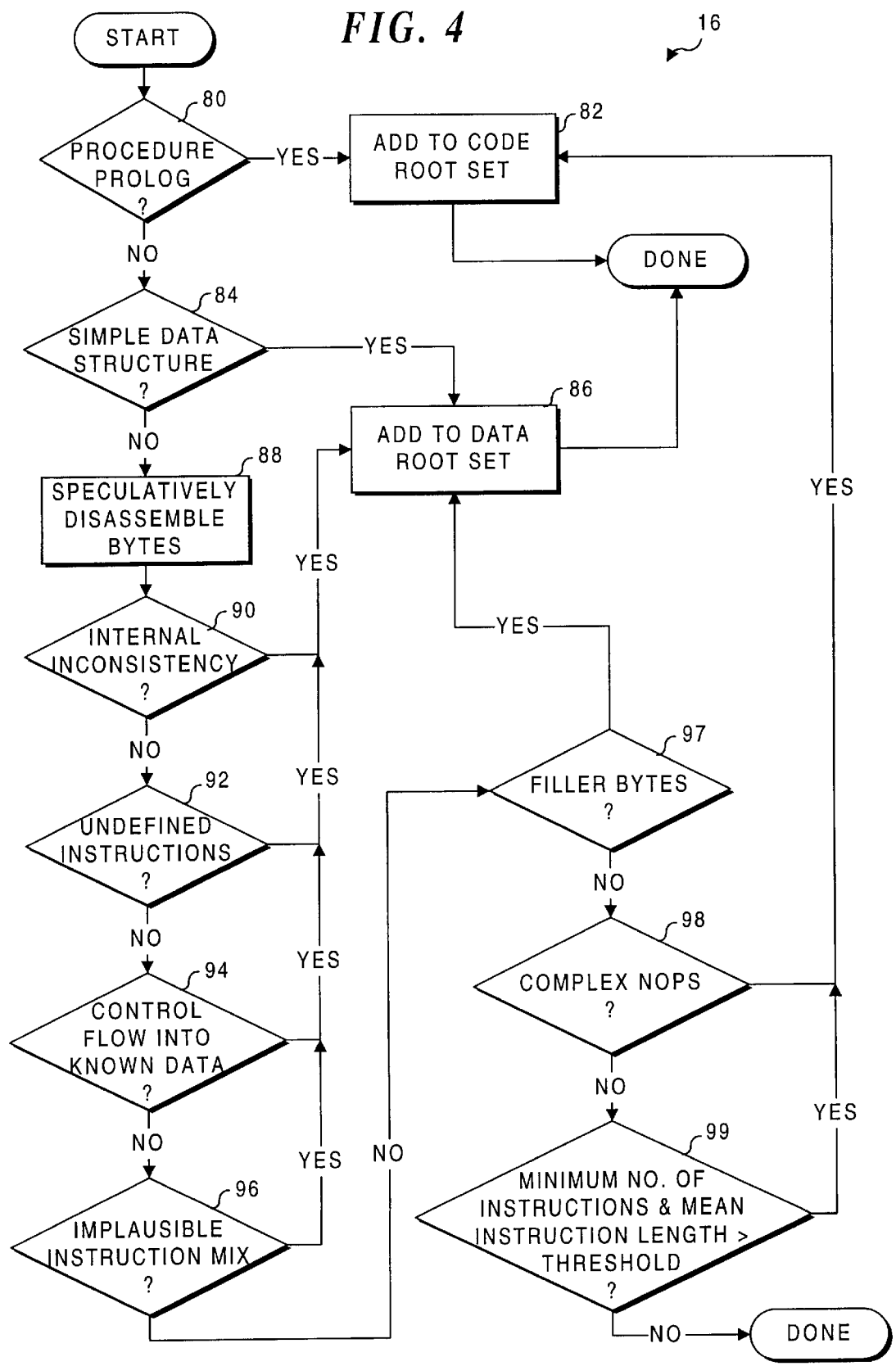
FIG. 4 is a flow chart illustrating the steps applied in analyzing root portions of the program that are previously unknown.

Essential to the accuracy of the code discovery procedure is the procedure used to analyze unknown roots, details of which are set forth in FIG. 4. A preferred embodiment of the present invention uses the following approach to analyze unknown roots. The approach first determines whether a root starts a procedure prolog, and if so, it is thereby identified as code and is added to the code root set, as indicated in a block 82. Procedure prologs are a set of commonly used instruction sequences that compilers use.

If the root is not a procedure prolog, a decision block 84 determines if it is a simple data structure. If the root starts with such a sequence, then it is considered data. Simple data structures, such as strings and tables of data, are readily identified. It is not uncommon for read-only strings to be embedded in executables. The algorithm examines the bytes at the root to see if they might be strings. Specifically, if the bytes are a sequence of printable characters of at least a predefined length, then they are considered strings. A preferred embodiment of the present invention recognizes both ASCII and Unicode strings.

Also recognized by the preferred embodiment are tables of data. For example, if the invention finds that a sequence of relocation targets refer to consecutive addresses separated by a relatively small, fixed increment, then these addresses are considered to be elements of a table. A root recognized as a simple data structure is added to the data root set, in accord with a block 86. Following either blocks 82 or 86, the procedure is done with the current root and continues analyzing the next unknown root until all unknown roots have been processed.

If the root is not a simple data structure, the procedure carries out speculative disassembling of the bytes comprising the root, as noted in a block 88. To identify code by speculative disassembling, the preferred embodiment first tries to recognize the root bytes as known data constructs. If the root is not a known data construct, then it is speculatively disassembled, as if it were code. The resulting speculatively disassembled code is then analyzed to determine if it "makes sense" as code. In other words, if the speculatively disassembled code could not function as code in a logical sense, then it must be data and not code.

Following block 88, a decision block 90 determines if the speculative disassembly of bytes yields an internal inconsistency. If the disassembled sequence has an internal inconsistency, such as control flow instructions that jump outside of the address space of the application or into the middle of other instructions, then the root is considered "unknown." (In this disclosure and the claims that follow, the term "unknown" is employed in referring to byte sequences within the program whose function has not yet been clearly identified. At the end of the process employed to identify code and data portions of a program, any remaining "unknown" sequences are treated as data). Since the root is unknown, it is presumed to be data and is added to the data root set in block 88. Otherwise, a decision block 92 determines if the speculative disassembly yielded undefined instructions. If the disassembled sequence has an undefined instruction, then the root is again considered "unknown" and added to the data root set, as per block 86. Conversely, a negative result leads to a decision block 94, which determines if the disassembled sequence causes control flow to transfer into known data; if so, the root is considered "unknown" and added to the data root set.

A negative response to decision block 94 leads to a decision block 96, which determines if the disassembled sequence has an "unusual" instruction mix. If so, the root is considered "unknown," leading to the result of block 86. An instruction mix is considered unusual if it contains multiple consecutive instructions of the same type (e.g., this result occurs if a sequence of null bytes is interpreted as instructions), or if it contains more than a minimum number of rarely used instructions (e.g., instructions with rare address modes).

Following a negative response to decision block 96, a decision block 97 determines if a disassembled sequence is a sequence of filler bytes, and if so, the bytes are considered data, leading to block 86. Often compilers will use a linear sequence of identical bytes as a filler between procedures so that the procedures start at a preferred address space alignment. These bytes are typically null bytes, breakpoints, or no operation (nop) commands. If the sequence is not filler bytes, a decision block 98 determines if the disassembled sequence is a sequence of complex nops. If so, the bytes are treated as code and the root is added to the code root set in block 82. A complex nop is a complex instruction that, when executed, does not change the processor or memory state, but instead, effectively only advances the program counter. Some compilers use complex nop instruction sequences as a filler between procedures, or as a filler between different code paths within a procedure, again to achieve a preferred address space alignment.

Following a negative response to decision block 98, a decision block 99 determines if the disassembled sequence includes more than a predefined minimum number of instructions, and if the mean instruction length is greater than a predefined minimum threshold. If the sequence satisfies the above noted criteria, then it is treated as code.

Otherwise, it is treated as "unknown." While not shown in FIG. 4, a negative result to decision block 99 causes the root to be added to the data root set. In a preferred embodiment, by way of example and not to as a limitation on the present invention, the predefined minimum number of instructions is four and the predefined minimum threshold is 2.25.

Using the initial root set, the code discovery procedure typically identifies 90% of the text sections of an executable module as code or data. The code discovery procedure now optionally determines new root sets by examining the remaining gaps of unknown bytes in the text sections. This preferred embodiment treats the starting address of each gap as a root, and disassembles the code at that root, using the above described technique. It is valid to treat the starting address as a root because the gap necessarily follows either known code or data, and so the starting address must either be at the start of an instruction element or of a data element.

The invention performs the above process iteratively. Since discovering new code or data components may make it possible to positively identify previously unknown bytes as code or data, the procedure iterates over all gaps any time it makes progress in identifying the nature of at least one gap in the binary executable software program. The preferred embodiment of the invention uses a maximum iteration count to bound the time spent examining gaps. In this embodiment, by way of example and not as a limitation on the invention, the maximum iteration count used is equal to 20.

Each compiler can potentially use a different implementation of a code generation construct. For example, compilers can differ on the exact implementation of branch tables that they produce, or they can differ on the format of debug information in the binary executable software program. When the code discovery procedure can identify the compiler used to generate the executable, it can use knowledge about specific compiler parameters and constructs to aid the code discovery process.

At initialization, the code discovery procedure identifies the compiler used to produce the executable. To identify the compiler, the procedure looks at known places in the executable for strings that identify the compiler (these strings are placed there by the compiler), and examines the names of the sections in the executable (each compiler uses different naming conventions for executable sections).

Once it has identified the compiler, the procedure employed in the present invention customizes its behavior to that compiler. For example, if the compiler that has been identified uses a specific sequence of instructions for loading target addresses from branch tables, the procedure used in the preferred embodiment of the invention can specifically look for those sequences to determine the branch table addresses. If the compiler uses offset tables in conjunction with branch tables, and places branch tables and offset tables in a particular order, the procedure can look for them in the expected format. Also, if the compiler uses hand-coded instruction sequences that violate static instruction boundaries, such as having instructions jump into the middle of other instructions, the procedure can look for and detect such sequences.

Computer Suitable for Implementing the Present Invention

Figure 5:
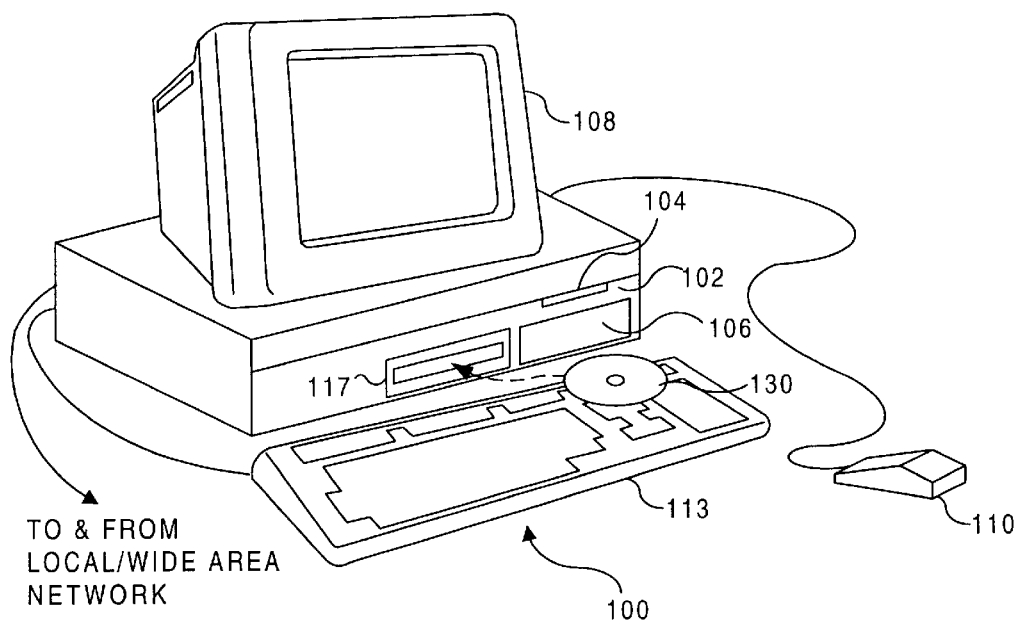
FIG. 5 is an isometric view of an exemplary personal computer suitable for implementing the present invention.

With reference to FIG. 5, a generally exemplary personal computer 100 is illustrated, which is suitable for use in practicing the present invention. The personal computer includes a processor chassis 102 in which are mounted a hard drive 106 and, optionally, a floppy disk drive 104. A motherboard within the processor chassis is populated with appropriate integrated circuits (not shown) and a power supply (also not shown). A monitor 108 is included for displaying graphics and text generated by software programs executed by the personal computer. A mouse 110 (or other pointing device) is connected to a serial port (or to a bus port) on the rear of processor chassis 102, and signals from mouse 110 are conveyed to the motherboard to control a cursor and to select text, menu options, and graphic components displayed on monitor 108 in response to software programs executing on the personal computer, including the software program implementing the present invention. In addition, a keyboard 113 is coupled to the motherboard for entry of text and commands that affect the running of software programs executing on the personal computer.

Personal computer 100 also optionally includes a compact disk-read only memory (CD-ROM) drive 117 into which a CD-ROM disk may be inserted so that executable files and data on the disk can be read for transfer into the memory and/or into storage on hard drive 106 of personal computer 100. Personal computer 100 can be coupled to a LAN or a wide area network (WAN).

Figure 6:
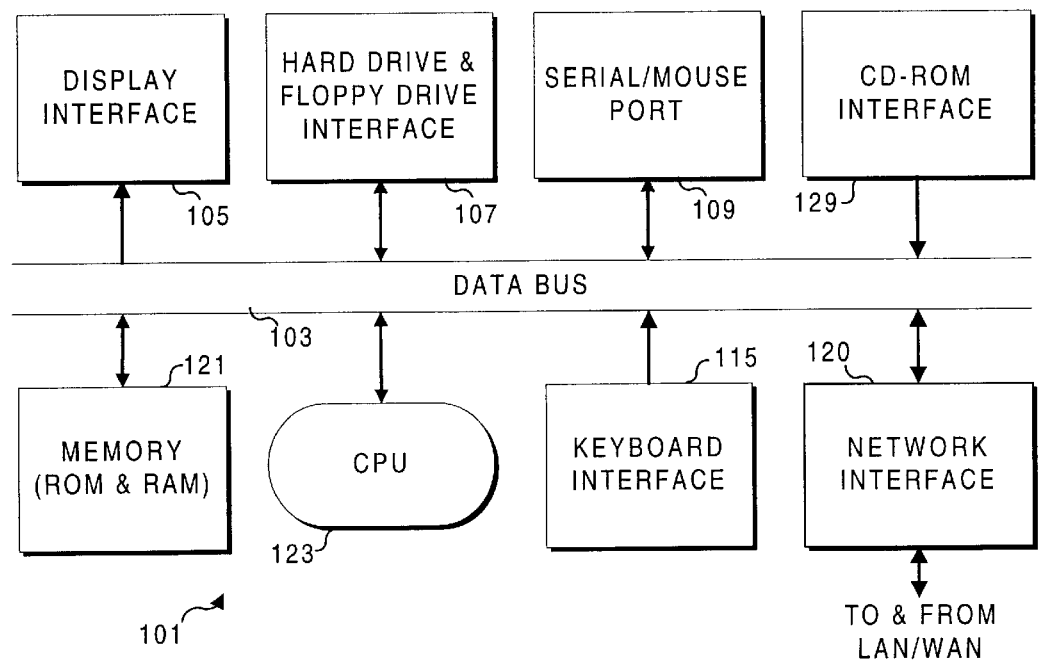
FIG. 6 is a block diagram showing functional elements within the processor chassis of the personal computer in FIG. 5.

Although details relating to all of the components mounted on the motherboard or otherwise installed inside processor chassis 102 are not illustrated, FIG. 6 illustrates some of the functional components that are included. The motherboard includes a data bus 103 to which these functional components are electrically connected. A display interface 105 generates signals in response to instructions executed by a central processing unit (CPU) 123 that are transmitted to monitor 108 so that graphics and text are displayed on the monitor. A hard drive interface 107 is coupled to data bus 103 to enable bi-directional flow of data and instructions between data bus 103 and floppy drive 104 and/or hard drive 106. Software programs executed by CPU 123 are typically stored on either hard drive 106, or on a floppy disk (not shown) that is inserted into floppy drive 104. The current preferred embodiment of the present invention will likely be distributed as a stand-alone application or software tool that is designed to run under an operating system such as Microsoft Corporation's WINDOWS NT. The computer language instructions that cause the CPU to implement the present preferred embodiment of the present invention will thus likely be distributed on a memory media, such as floppy disks, on a CD-ROM disk 130, or on other optical or magnetically readable media. Alternatively, the software may be distributed over the Internet or other network.

A serial/mouse port 109 is also bi-directionally coupled to data bus 103, enabling signals developed by mouse 110 to be conveyed through the data bus to CPU 123. A CD-ROM interface 129 connects CD-ROM drive 117 to data bus 103. The CD-ROM interface may be a small computer systems interface (SCSI) type interface or other interface appropriate for connection to and operation of CD-ROM drive 117. Although a CD-ROM drive is indicated, it is also contemplated that other types of optical storage devices such as a DVD and an appropriate interface might also be used.

A keyboard interface 115 receives signals from keyboard 113, coupling the signals to data bus 103 for transmission to CPU 123. Coupled to data bus 103 is a network interface 120 (which may comprise, for example, an ETHERNET card for coupling the personal computer to a LAN and/or WAN). Thus, software used in connection with the present invention may optionally be stored on a remote server and transferred to personal computer 100 over the network to implement the present invention.

When a software program is executed by CPU 123, the computer instructions comprising the program that are stored on memory media such as a floppy disk, CD-ROM disk 130, a server (not shown), or on hard drive 106 are transferred into a memory 121 via data bus 103. Computer instructions comprising the software program are executed by CPU 123, causing it to implement functions determined by the instructions. Memory 121 includes both a non-volatile read only memory (ROM) in which computer instructions used for booting personal computer 100 are stored, and a random access memory (RAM) in which computer instructions and data are temporarily stored when executing programs, such as the software program implementing the present invention.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for automatically identifying code portions and data portions in a binary executable software program, wherein the code portions comprise machine instructions that are of arbitrary length, comprising the steps of:
   (a) determining a set of addresses in the binary executable software program that are for any known code portions and for any known data portions;
   (b) disassembling machine instructions at a starting address for each known code portion, to identify a set of all possible control flow paths reachable from said starting address, and from the control flow paths that are thus identified, determining a set of target addresses so as to identify other code portions and other data portions;
   (c) beginning with bytes of the binary executable software program located at any address that could be a starting point for either a code portion or a data portion, analyzing the bytes to determine if said bytes comprise a code portion; and
   (d) reiteratively processing addresses in the binary executable software program that have not yet been identified as being for code portions and for data portions, by repeating steps (b) and (c), to identify other code portions and data portions in the binary executable software program until no further code portions and data portions are identifiable.

2. The method of claim 1, wherein the executable software program comprises a plurality of executable modules, said step of determining the set of addresses in the binary executable software program that are for any known code portions and for any known data portions comprising the step of identifying the plurality of executable modules.

3. The method of claim 2, wherein an executable module from the plurality of executable modules includes both code and data portions.

4. The method of claim 2, further comprising the steps of statically determining and adding an entry address for each of the plurality of executable modules, to said set of addresses, and of adding any addresses for code portions and data portions that are referenced and identified by any debug address, any export address, and any relocation address within the binary executable software program, to said set of addresses.

5. The method of claim 4, further comprising the steps of:
   (a) executing the binary executable software program to dynamically identify other executable modules of the plurality of executable modules while the binary executable software program is running;
   (b) determining and adding an entry address for each of the other executable modules, and any addresses for code portions and data portions, which are referenced and identified by any debug address, any export address, and any relocation address within the binary executable software program, to said set of addresses.

6. The method of claim 1, further comprising the step of removing any addresses for data portions that have been determined or identified from any unexamined address ranges for code portions that have been determined or identified.

7. The method of claim 1, wherein the step of disassembling machine instructions comprises the steps of:
   (a) determining for each control flow path, whether a control flow instruction in the control flow path is direct or indirect; and
   (b) following the control flow path to a target address if the instruction is direct, and determining the target address from a memory location or register referenced by the instruction, if the instruction is indirect.

8. The method of claim 1, wherein the step of disassembling machine instructions comprises the steps of:
   (a) determining for each control flow path, whether each control flow instruction in the control flow path is conditional or unconditional; and
   (b) for each control flow instruction in the control flow path:
      (i) if the control flow instruction is conditional, identifying a following instruction as an implicit target address, and also identifying a target address that is referenced in a branch by the control flow instruction; else
      (ii) if the control flow instruction is unconditional, identifying a target address based on the control flow instruction.

9. The method of claim 1, wherein the step of analyzing the bytes comprises the steps of:
   (a) determining if the bytes comprise a set of instruction sequences for a procedure prolog, and if so, identifying the bytes as a code portion; and
   (b) determining if the bytes include a sequence of printable characters of at least a predefined length, and if so, identifying the bytes as a data portion.

10. The method of claim 9, wherein the step of analyzing the bytes further comprises the steps of:
    (a) attempting to speculatively disassemble the bytes, based on a presumption that the bytes comprise a code portion; and
    (b) classifying the bytes as an unknown portion of the binary executable software program if the attempt to speculatively disassemble the bytes results in at least one of the following:
       (i) an internal logical inconsistency;
       (ii) an undefined machine instruction;
       (iii) a transfer into a known data portion;
       (iv) a plurality of machine instructions that meets one of a plurality of predefined criteria indicating that the plurality of machine instructions are abnormal;
       (v) a plurality of filler bytes;
       (vi) a sequence of no operation instructions; and
       (vii) more than a predefined minimum of machine instructions having a length greater than a predefined threshold.

11. The method of claim 1, wherein the step of reiteratively processing addresses in the binary executable software program that have not yet been identified as being for code portions and for data portions comprises the step of treating a starting address for each range of addresses not yet identified as a presumed new root address of either a code portion or a data portion before applying steps (b) and (c).

12. The method of claim 1, wherein the binary executable software program includes sections that are not identifiable as either a code portion or a data portion, said sections being left undisturbed and treated as unidentified portions of the binary executable software program.

13. The method of claim 1, further comprising the steps of:
   (a) determining a compiler that was used to compile the binary executable software program; and
   (b) identifying code portions and data portions of the binary executable software program, as a function of compiler specific parameters, based upon the compiler used.

14. A system for automatically identifying code portions and data portions in a binary executable software program, wherein the code portions comprise machine instructions that are of arbitrary length, comprising:
   (a) a memory in which machine instructions and data are storable, said machine instructions including the machine instructions comprising the code portions of the binary executable software program as well as machine instructions comprising a software tool; and
   (b) a processor, coupled to the memory, said processor executing the machine instructions comprising the software tool, which cause the processor to:
      (i) load the binary software executable program into the memory and determine a set of addresses in the binary executable software program that are for any known code portions and for any known data portions;
      (ii) disassemble the machine instructions comprising the binary executable software program at a starting address for each known code portion, to identify a set of all possible control flow paths reachable from said starting address, and from the control flow paths that are thus identified, determine a set of target addresses so as to identify other code portions and other data portions;
      (iii) beginning with bytes of the executable software program located at any address in the binary executable software program that could be a starting point for either a code portion or a data portion, analyze the bytes to determine if said bytes comprise a code portion; and
      (iv) reiteratively process addresses in the binary executable software program that have not yet been identified as being for code portions and for data portions, by repeating (ii) and (iii) above, to identify other code portions and data portions in the binary executable software program until no further code portions and data portions therein are identifiable.

15. The system of claim 14, wherein the executable software program comprises a plurality of executable modules, said machine instructions comprising the software tool causing the processor to identify the plurality of executable modules.

16. The system of claim 15, wherein an executable module from the plurality of executable modules includes both code and data portions.

17. The system of claim 15, wherein the machine instructions comprising the software tool cause the processor to statically determine and add an entry address for each of the plurality of executable modules to said set of addresses, and further cause the processor to add any addresses for code portions and data portions that are referenced and identified by any debug address, any export address, and any relocation address within the binary executable software program, to said set of addresses.

18. The system of claim 14, wherein the processor removes any addresses for data portions that have been determined or identified from any unexamined address ranges of code portions that have been determined or identified.

19. The system of claim 18, wherein the machine instructions comprising the software tool cause the processor to:
   (a) execute the binary executable software program to dynamically identify other executable modules of the plurality of executable modules while the binary executable software program is running; and
   (b) determine and add an entry address for each of the other executable modules, and any addresses for code portions and data portions, which are referenced and identified by any debug address, any export address, and any relocation address within the binary executable software program, to said set of addresses.

20. The system of claim 14, wherein to disassemble the instructions, the processor:
   (a) determines for each control flow path, whether a control flow instruction in the control flow path is direct or indirect; and
   (b) follows the control flow path to a target address if the instruction is direct, and determines the target address from a memory location or register referenced by the instruction, if the instruction is indirect.

21. The system of claim 14, wherein to disassemble the instructions, the processor:
   (a) determines for each control flow path, whether each control flow instruction in the control flow path is conditional or unconditional; and
   (b) for each control flow instruction in the control flow path:
      (i) if the control flow instruction is conditional, identifies a following instruction as an implicit target address, and identifies a target address that is referenced in a branch by the control flow instruction; and
      (ii) if the control flow instruction is unconditional, identifies a target address based on the control flow instruction.

22. The system of claim 14, wherein to analyze the bytes, the processor:
   (a) determines if the bytes comprise a set of instruction sequences for a procedure prolog, and if so, identifies the bytes as a code portion; and
   (b) determines if the bytes include a sequence of printable characters of at least a predefined length, and if so, identifies the bytes as a data portion.

23. The system of claim 22, wherein to analyze the bytes, the processor further:
   (a) attempts to speculatively disassemble the bytes, based on a presumption that the bytes comprise a code portion; and
   (b) classifies the bytes as an unknown portion of the binary executable software program if the attempt to speculatively disassemble the bytes results in at least one of the following:
      (i) an internal logical inconsistency;
      (ii) an undefined machine instruction;

(iii) a transfer into a known data portion;

(iv) a plurality of machine instructions that meets one of a plurality of predefined criteria indicating that the plurality of machine instructions are abnormal;

(v) a plurality of filler bytes;

(vi) a sequence of no operation instructions; and (vii) more than a predefined minimum of machine instructions having a length greater than a predefined threshold.

24. The system of claim 14, wherein to reiteratively process addresses in the binary executable software program that have not yet been identified as being for code portions and for data portions, the processor treats a starting address for each range of addresses not yet identified as a presumed new root address of either a code portion or a data portion before applying (b)(ii) and (b)(iii).

25. The system of claim 14, wherein the binary executable software program includes sections that are not identifiable as either a code portion or a data portion, said sections being left undisturbed and treated as unidentified portions of the binary executable software program by the processor.

26. The system of claim 14, wherein the machine instructions comprising the software tool further cause the processor to:

(a) determine a compiler that was used to compile the binary executable software program; and (b) identify code portions and data portions of the binary executable software program, as a function of compiler specific parameters that are based upon the compiler used.

27. A computer readable medium having computer-executable instructions, which when executed on a computer, cause the computer to automatically identify code portions and data portions in a binary executable software program, wherein the code portions comprise machine instructions that are of arbitrary length, said computer-executable instructions causing the computer to perform the steps of:

(a) determining a set of addresses in the binary executable software program that are for any known code portions and for any known data portions;

(b) disassembling machine instructions at a starting address for each known code portion, to identify a set of all possible control flow paths reachable from said starting address, and from the control flow paths that are thus identified, determining a set of target addresses so as to identify other code portions and other data portions;

(c) beginning with bytes of the executable software program located at any address in the binary executable software program that could be a starting point for either a code portion or a data portion, analyzing the bytes to determine if said bytes comprise a code portion; and (d) reiteratively processing addresses in the binary executable software program that have not yet been identified as being for code portions and for data portions, by repeating steps (b) and (c), to identify other code portions and data portions in the binary executable software program until no further code portions and data portions are identifiable.

28. The computer readable medium of claim 27, wherein the executable software program comprises a plurality of executable modules, said step of determining the set of addresses in the binary executable software program that are for any known code portions and for any known data portions comprising the step of identifying the plurality of executable modules.

29. The computer readable medium of claim 28, wherein an executable module from the plurality of executable modules includes both code and data portions.

30. The computer readable medium of claim 28, having further computer-executable instructions for performing the steps of statically determining and adding an entry address for each of the plurality of executable modules, to said set of addresses, and of adding any addresses for code portions and data portions that are referenced and identified by any debug address, any export address, and any relocation address within the binary executable software program, to said set of addresses.

31. The computer readable medium of claim 30, having further computer-executable instructions for performing the steps of:

(a) executing the binary executable software program to dynamically identify other executable modules of the plurality of executable modules while the binary executable software program is running; and (b) determining and adding an entry address for each of the other executable modules, and any addresses for code portions and data portions, which are referenced and identified by any debug address, any export address, and any relocation address within the binary executable software program, to said set of addresses.

32. The computer readable medium of claim 27, having further computer-executable instructions for performing the step of removing any addresses for data portions that have been determined or identified from any unexamined address ranges for code portions that have been determined or identified.

33. The computer readable medium of claim 27, wherein the step of disassembling machine instructions comprises the steps of:

(a) determining for each control flow path, whether a control flow instruction in the control flow path is direct or indirect; and (b) following the control flow path to a target address if the instruction is direct, and determining the target address from a memory location or register referenced by the instruction, if the instruction is indirect.

34. The computer readable medium of claim 27, wherein the step of disassembling machine instructions comprises the steps of:

(a) determining for each control flow path, whether each control flow instruction in the control flow path is conditional or unconditional; and (b) for each control flow instruction in the control flow path:

(i) if the control flow instruction is conditional, identifying a following instruction as an implicit target address, and identifying a target address that is referenced in a branch by the control flow instruction; else (ii) if the control flow instruction is unconditional, identifying a target address based on the control flow instruction.

35. The computer readable medium of claim 27, wherein the step of analyzing the bytes comprises the steps of:

(a) determining if the bytes comprise a set of instruction sequences for a procedure prolog, and if so, identifying the bytes as a code portion; and (b) determining if the bytes include a sequence of printable characters of at least a predefined length, and if so, identifying the bytes as a data portion.

36. The computer readable medium of claim 35, wherein the step of analyzing the bytes further comprises the steps of:
   (a) attempting to speculatively disassemble the bytes, based on a presumption that the bytes comprise a code portion; and
   (b) classifying the bytes as an unknown portion of the binary executable software program if the attempt to speculatively disassemble the bytes results in at least one of the following:
      (i) an internal logical inconsistency;
      (ii) an undefined machine instruction;
      (iii) a transfer into a known data portion;
      (iv) a plurality of machine instructions that meets one of a plurality of predefined criteria indicating that the plurality of machine instructions are abnormal;
      (v) a plurality of filler bytes;
      (vi) a sequence of no operation instructions; and
      (vii) more than a predefined minimum of machine instructions having a length greater than a predefined threshold.

37. The computer readable medium of claim 27, wherein the step of reiteratively processing addresses in the binary executable software program that have not yet been identified as being for code portions and for data portions comprises the step treating a starting address for each range of addresses not yet identified as a presumed new root address of either a code portion or a data portion before applying steps (b) and (c).

38. The computer readable medium of claim 27, wherein the binary executable software program includes sections that are not identifiable as either a code portion or a data portion, said sections being left undisturbed and treated as unidentified portions of the binary executable software program.

39. The computer readable medium of claim 27, having further computer-executable instructions for performing the steps of:
   (a) determining a compiler that used to compile the binary executable software program; and
   (b) identifying code portions and data portions of the binary executable software program, as a function of compiler specific parameters that are based upon the compiler used.

* * * * *